(12) United States Patent
Piper et al.

(10) Patent No.: US 7,818,370 B2
(45) Date of Patent: Oct. 19, 2010

(54) EVENT SERVER USING CLUSTERING

(75) Inventors: Andrew Piper, Amersham (GB);
Alexandre de Castro Alves, San Jose, CA (US)

(73) Assignee: BEA Systems, Inc., Redwood Shores, CA (US)

( * ) Notice: Subject to any disclaimer, the term of this patent is extended or adjusted under 35 U.S.C. 154(b) by 0 days.

(21) Appl. No.: 12/332,490

(22) Filed: Dec. 11, 2008

(65) Prior Publication Data

US 2009/0292759 A1 Nov. 26, 2009

Related U.S. Application Data

(60) Provisional application No. 61/054,673, filed on May 20, 2008.

(51) Int. Cl.
*G06F 15/16* (2006.01)
*G06F 12/00* (2006.01)

(52) U.S. Cl. .................................... 709/203; 709/250

(58) Field of Classification Search ................ 709/203, 709/220–221, 217–219, 250, 248
See application file for complete search history.

(56) References Cited

U.S. PATENT DOCUMENTS

| | | | |
|---|---|---|---|
| 5,583,561 A | 12/1996 | Baker | |
| 5,924,096 A | 7/1999 | Draper | |
| 6,466,949 B2 | 10/2002 | Yang | |
| 6,831,918 B1 * | 12/2004 | Kavak | 370/395.52 |
| 6,847,993 B1 | 1/2005 | Novaes | |
| 6,857,082 B1 | 2/2005 | Josan | |
| 7,089,211 B1 | 8/2006 | Trostle | |
| 7,111,001 B2 | 9/2006 | Harris | |
| 7,155,438 B2 | 12/2006 | Potter | |
| 2002/0016867 A1 | 2/2002 | Kampe | |
| 2004/0019669 A1 * | 1/2004 | Viswanath et al. | 709/223 |
| 2005/0097317 A1 * | 5/2005 | Trostle et al. | 713/163 |
| 2005/0229183 A1 | 10/2005 | Araujo | |
| 2006/0146821 A1 * | 7/2006 | Singh et al. | 370/390 |
| 2008/0005358 A1 * | 1/2008 | Kwon et al. | 709/248 |
| 2008/0052556 A1 | 2/2008 | Donovan | |
| 2008/0209078 A1 | 8/2008 | Bates | |
| 2009/0052449 A1 * | 2/2009 | Ramakrishnan et al. | 370/390 |

OTHER PUBLICATIONS

Pallickara, "Efficient Matching of Events in Distributed Middleware Systems", Journal of Digital Information Management, Jun. 2004, pp. 79-86, vol. 2, No. 2. retrieved from: http://grids.ucs.indiana.edu/ptliupages/publications/jdim-vol2-num2.pdf.

(Continued)

*Primary Examiner*—Zarni Maung
(74) *Attorney, Agent, or Firm*—Fliesler Meyer LLP

(57) ABSTRACT

An event server receiving input streams of events and producing output streams of events is adapted to be clustered with other event servers. The event server uses configuration data to control the event processing. The event server multicasting updates of the configuration data to the other event servers of the cluster and receiving multicasted configuration updates from one of the other event servers of the cluster.

15 Claims, 3 Drawing Sheets

OTHER PUBLICATIONS

Pallickara, "On the Matching of Events in Distributed Brokering Systems", 11 pages. retrieved from: http://grids.ucs.indiana.edu/ptliupages/publications/MatchingEvents.pdf.

Carzaniga, "Architectures for an Event Notification Service Scalable to Wide-area-Networks", 115 pages. retrieved from: http://www.ifs.uni-linz.ac.at/ifs/staff/kimmerstorfer/literature/event_services/phd_thesis.pdf.

White, et al., "WebLogic Event Server: A Lightweight, Modular application server for Event Processing", DEBS '08, Jul. 2-4, 2008, 8 pages. retrieved from: http://blogs.oracle.com/CEP/paper10.pdf.

BEA Systems, Inc., "BEA WebLogic Server", May 2007, 508 pages. retrieved from: http://e-generation.beasys.com/wls/docs92/pdf/ejb.pdf.

DMREVIEW.COM, "Event Stream Processing", 3 pages. retrieved from: http://www.dmreview.com/dmdirect/20050729/1033537-1.html.

Nenov, et al., "Memory Sensitive Caching in Java", International Conference on Computer Systems and Technologies, CompSysTech' 2005, 6 pages. retrieved from: http://ecet.ecs.ru.acad.bg/cst05/Docs/cp/SII/II.20.pdf.

\* cited by examiner

EVENT SERVER USING CLUSTERING

CLAIM OF PRIORITY

This application claims priority to U.S. Provisional Application No. 61/054,673 entitled "EVENT SERVER USING CLUSTERING" by Seth White, et al., filed May 20, 2008 which is hereby incorporated by reference.

BACKGROUND

Event servers are used to process on streams of data in realtime. Typically, one or more input streams are converted into a much smaller output stream.

DETAILED DESCRIPTION

Figure 1:
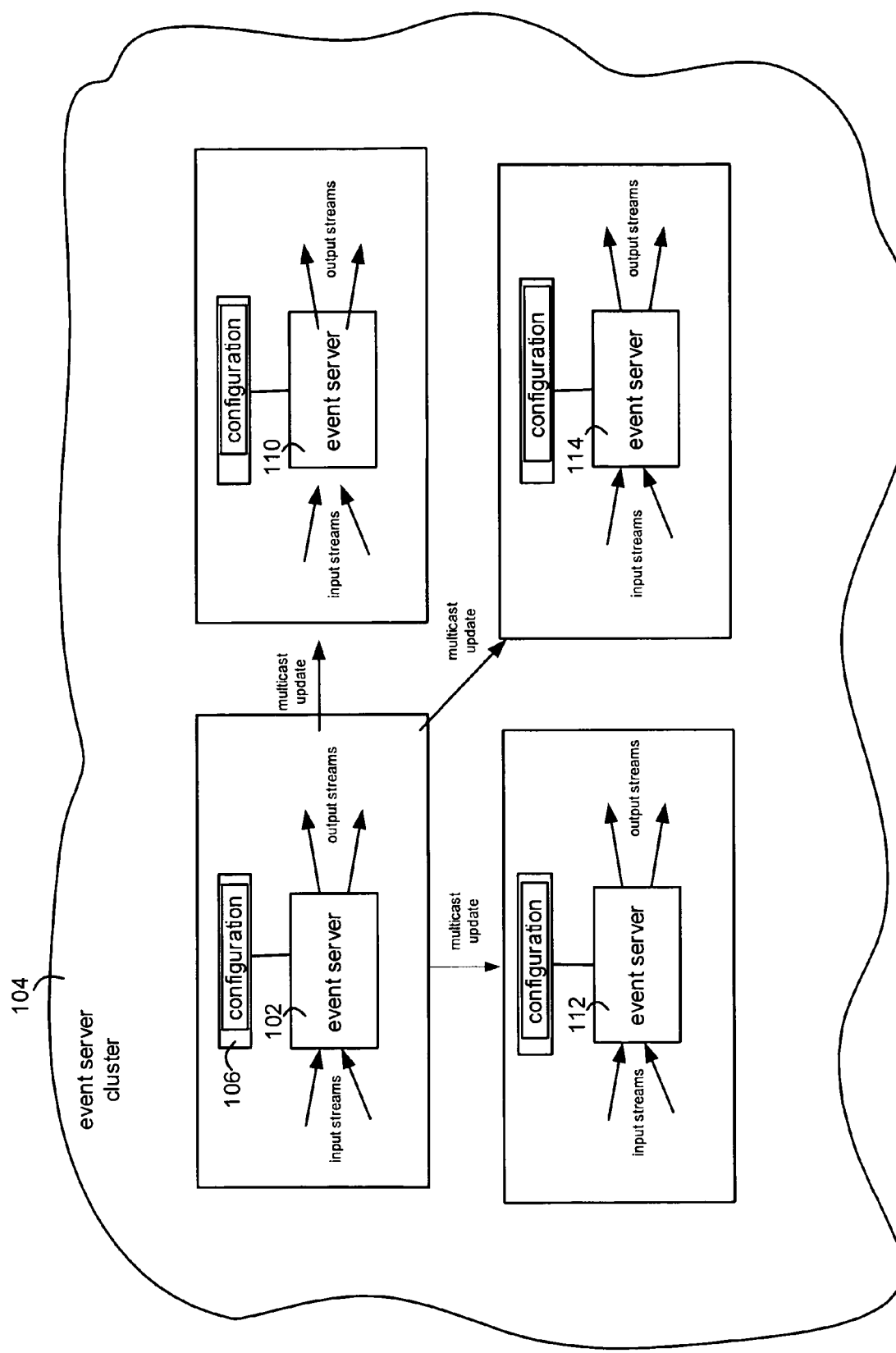
FIG. 1 shows an event server using clustering.

FIG. 1 shows an example of an event server cluster of the present invention. An event server 102 can receive input streams of events and producing output streams of events. The event server 102 is adapted to be clustered with other event servers into a cluster 104. The event server 102 can configure data 106 to control the event processing. The event server 102 can multicast updates of the configuration data to the other event servers 110, 112 and 114 of the cluster 104. The event server 102 can also receive multicasted configuration updates from other event servers of the cluster 110, 112 and 114.

The configuration data 106 can include code in an event processing language.

In one embodiment, the event servers 102, 110, 112, 114 of the cluster do not share a common memory.

The multicasting messages can go to each of the other event servers 110, 112, 114 of the cluster 104.

In one embodiment, upon a failure of one of the event server of the cluster, another event server of the cluster continues processing.

A method of the present invention can comprise receiving an input event stream; processing the event stream using configuration data; producing an output event stream; multicasting updates of the configuration data to other event servers of the cluster and receiving multicasted updates from at least one of the other event servers of the cluster.

An event server domain can be a set of servers logically connected for the purposes of management. The event server of the domain can be physically connected via a shared UDP multicast address. All servers in a WLEVs domain can be aware of all other servers in the domain. In one embodiment, any one server can be used as an access point for making changes to the deployments in the domain.

Management of the clustering infrastructure can be done at the domain level. Thus server failure, start or restart can be detected by every member of the domain. Each member of the domain can have a consistent, agreed notion of domain membership enforced by the clustering infrastructure.

In one embodiment, for servers to be considered as part of the same domain, they share both the same multicast address and the same domain name. These attributes can be managed automatically by the infrastructure.

In order to support the deployment and management of clustering concerns at a finer grained-level than the domain of groups can be used. A group can be a set of one or more servers with a unique name within the domain. In a domain, an arbitrary number of groups may exist with a configurable group membership. A server may be a member of more than one group. In addition, in one embodiment, a number of pre-defined groups always exist.

The singleton server group can be a group consisting of only the local server. Thus this group's membership is different depending on which server it is accessed from. The local server group can be used to pin deployments to a single server.

The domain group can be a group containing all live members of the domain. In one embodiment, its membership is automatically managed and cannot be changed by the user.

Deployment of an application can be done to a particular group. Applications deployed to the domain or individual groups can have a unique name across the domain.

In order to provide HA-like capabilities to adapter implementations a number of notification and messaging APIs can be provided at both the group and domain-level. Thus a server can be able to receive notification when its group membership changes—both administratively and through server failure—and also when its domain membership changes. Likewise messages can be sent to both individual groups and to the domain.

Exemplary use cases are described below.

One exemplary use case is a zero-downtime Data-feed Processor that does server-side processing of events without loss of availability.

1. An event server application can subscribe to events from a data feed, processes those events and publish resulting events to a data sink.
2. In case of a fail-stop failure can occur in the system, the application can continue to process events with no discernable loss of availability. Furthermore, in the case of an omission or timing failure in the system, the application can continue to process events with no discernable loss of availability.

One exemplary use case is Hot-Hot Clustering. For example, instance 1 fails. It is restarted and its applications are redeployed to it. Since both instances are "live" there is no discernible loss of service. Both servers can publish data to a downstream system (Tibco, JMS, JDBC etc). The application can be written in such a way as to cope with multiple identical results (for instance through a consensus of results). If a shared result is required then some kind of shared state can come into play.

Another exemplary use case is Hot-Hot Clustering with Framework failover. For example, failover between outbound adapters can be coordinated by the framework so that duplicate results do not have to be taken into account. At the simplest level this can be provided in the form of activation callbacks.

The servers in a domain can update their state by exchanging cluster-related messages.

These messages can be at least checked for integrity. A private key can be used to achieve integrity. This key can be shared by all servers in the domain.

In an active-active system, applications can be deployed homogeneously across several servers and are actively being executed.

There are cases when these homogeneously-deployed applications can elect a primary one as the leader.

In one example, the result from the leader is emitted, whereas the results of secondary servers are dropped. However, if the leader fails, then one of the secondary servers can be elected as the new leader.

To support this, the adapter, or event bean, generally in the role of an event sink, can implement GroupMembershipListener.

As the application starts, the event sink can be called back on:
   onMembershipChange(Server localIdentity, Configuration groupconfiguration);

The event sink can use the Server object (localIdentity) to verify if it is the leader. This can be done with:
   Server:isCoordinator( )

In order to only emit events if it is a coordinator the event sink can get a new Server identity every time membership in the group changes, such as it is the case if another server within the group falls and no longer is the coordinator.

The parameter groupConfiguration can allow a server to know what the current members of its group are as follows:

The domain group can be a live group that always exists and contains all servers in a domain. In another words, all servers can always be a member of the domain group. However, applications can be explicit deployed to it.

This can simplify the usage of a complete homogeneous environment.

By explicitly targeting an application to the domain group, one can guarantee that all servers of this homogeneous environment have this application. Contrast this to the case where one has to explicitly configure all servers to be a member of the same group, and then deploy to this group.

An undeployment example is described below. Consider domain D1 that contains S1, S2, and S3. All servers are only members of the domain group.
   Deploy application A1 into the domain group.
   The cluster state is:
   S1: {A1}, S2: {A1}, S3: {A1}
   Shutdown S3.
   Undeploy application A1:
   % JAVA com.bea.wlevs.deployment.Deployer—url http://server1:9002/wlevsdeployer—uninstall A1
   The new cluster state is:
   S1: { }, S2: { }
   Re-start S3 without changing its configuration. The new cluster state is:
   S1: {A1}, S2: {A1}, S3: {A1}

In this example, the fact that A1 is re-deployed to all servers in this case is somewhat counter-intuitive. It is a reflection of S3 being off-line during the un-deployment of A1.

A Static Group Membership Change example is described below.
   Consider the case of a domain D1 with servers S1, S2 and S3.
   S1, and S2 do not belong to any groups (aside their own singleton groups, which all servers are always a member of).
   S3 is a member of group G1
   Deploy application A1 into S1's singleton group:
   % JAVA com.bea.wlevs.deployment.Deployer-url http://server1:9002/wlevsdeployer-install A1
   Deploy application A2 into the domain group:
   % JAVA com.bea.wlevs.deployment.Deployer-url http://server1  :9002/wlevsdeployer-install  A2-group default
   Deploy application A3 into group G1:
   % JAVA com.bea.wlevs.deployment.Deployer—url http://server1:9002/wlevsdeployer—install A3-group G1
   So, the state of the servers is:
   S1: {A1, A2}, S2: {A2}, S3: {A2, A3}
   Next, shutdown S3 and change its server configuration so that it is now not a member of any group, from:
   <cluster><groups>G1</groups></cluster>
   To:
   <cluster><groups></groups></cluster>
   Re-start of S3 fails because it includes a deployed application that is referencing to a group for which the server no longer is a member of.
   Shutdown S3, update its deployment configuration file, from:
   <deployment id="A3" group="G1"/>
   To:
   <deployment id="A3" group="default"/>
   Restart S3, the new cluster state is:
   S1: {A1, A2, A3}, S2: {A2, A3}, S3: {A2, A3}

A domain upgrade to cluster example is described below.

Consider the case of two domains, D1 and D2. Domain D1 is not clustered; it has a single server S1 with application A1 deployed into it. Domain D2 is clustered; it contains servers S2 and S3 that are only members of the domain group, and server S4 member of the group G1. Application A2 is deployed to the domain group. Application A3 is deployed to group G1.

The current domain state is:
   S1: {A1}, S2: {A2}, S3: {A2}, S4: {A2, A3}
   Shutdown S1, and change its server cluster configuration to use the same multicast address of D2, essentially joining S1 into D2.

Application A1 will be considered an application of the singleton group for S1, and hence not updated into S2, S3, and S4.

Application A2 will be deployed into S1, as this application has been deployed to the domain group, which contains all servers in a domain. Application A3 is not deployed into S1.

The new domain state is:
   S1: {A1, A2}, S2: {A2}, S3: {A2}, S4: {A2, A3}

An application can be deployed without the specification of a group name.

This is a common case for both single-server domains, but also applicable to clustered domains.

In this case, the application can be deployed specifically to a special group that pertains only to the target server in question. In another words, each server in the domain can be automatically a member of a server-distinct singleton group.

An application deployed to the singleton group need have no 'groupname' attribute in its application deployment file.

Deployed application in 2.0 domains that are upgraded to execute in a cluster can be deployed to the singleton group.

The singleton group can also be identified by an internal string, which by default will be the same as the server name. This can allow a separate admin server to deploy an application to another server's singleton group.

There is also the case where a user may specify a group name even when running in single-server domain, generally the domain group. The intent is to allow the application to be re-deployed to other servers should this server join a clustered domain.

This can be considered a short-hand for a special case of a server being a member of multiple groups simultaneously.

The following describes an example of multiple groups in a domain. There are cases where the application logic cannot be replicated. For instance, the application needs to determine the best price provided by different pricing engines, or the application needs to send an alert when a position crosses a threshold. In one embodiment, the application is not idempotent; it must only calculate once, or send one single event.

There are other cases where the application has a singleton nature; such is the case for the monitoring application, the http pub-sub server, etc.

Because of these requirements, a domain can be able to support servers that are not completely homogeneous.

For example, consider a domain that has two applications. Application strategies have several strategies for calculating different prices for some derivative. Application strategies can be replicated to achieve fault-tolerance. Application strategies feed its result into application selector. Application selector selects the best price amongst the different options provided by application strategies' results. Application selector keeps state to be able to determine the best price and hence cannot be replicated in a hot/hot fashion.

This example can be implemented by using three servers (i.e. server1, server2, server3) and two groups.

Start the servers as described in the previous use-case.

Configure the desired topology by configuring the group membership directly in the server's external configuration file:

```
server1/config/config.xml:
    <cluster>
        <multicast-address>230.0.0.0</multicast-address>
        <identity>1</identity>
        <groups>selectorgroup</groups>
    </cluster>
```

The tag <groups> is a sequence of strings representing the groups that this server is a member of. In one embodiment, only a single, custom group will be allowed (this does not include the singleton or domain groups).

```
server2/config/config.xml:
    <cluster>
        <multicast-address>230.0.0.0</multicast-address>
        <identity>2</identity>
    <groups>strategygroup<groups>
    </cluster>
server3/config/config.xml:
    <cluster>
        <multicast-address>230.0.0.0</multicast-address>
        <identity>3</identity>
        <groups>strategygroup<groups>
    </cluster>
```

The tag <groups> can be optional, in which case the server is simply part of the system groups.

Finally, deploy the applications. The following command deploys application strategies to the Domain group, which contains server2 and server3:

% JAVA com.bea.wlevs.deployment.Deployer-url http://server1:9002/wlevsdeployer—install strategies—group strategygroup And the following deploys application selector to the selectorgroup:

% JAVA com.bea.wlevs.deployment.Deployer-url http://server1:9002/wlevsdeployer—install selector—group selectorgroup Note that both commands are executed in server1, however they could have been executed in any one of the servers in the domain (e.g. server2, server3).

The following describes a homogenous server example.

Create new domain directory similar to the 2.0 structure. However, create an additional layer to contain the servers:

```
my_domain/
    server1/
        startwlevs.cmd
        ...
    server2/
        startwlevs.cmd
        ...
```

Note that the directory structure can really be anything. The reason for this is to allow for servers that are hosted in machines that do not share file-systems. So, the following is a valid deployment:

Machine A:
   my_domain.server1/
      startwlevs.cmd
      . . .

Machine B:
   my_domain.server2/
      startwlevs.cmd
      . . .

Each server that participates on the same domain must configure its external server configuration file to use the same multicast-address and a different server identity:

```
server1/config/config.xml:
    <cluster>
        <multicast-address>230.0.0.0</multicast-address>
        <identity>1</identity>
    </cluster>
server2/config/config.xml:
    <cluster>
        <multicast-address>230.0.0.0</multicast-address>
        <identity>2</identity>
    </cluster>
```

Start the servers normally by executing the corresponding start scripts.

Because no groups have been pre-configured, both servers are members of just the pre-defined Domain group. Because we want to keep both servers homogeneous, there is no need on creating any other additional group.

The servers are running and can now host applications. Select any server in the group that is either server1 or server2 and deploy the application through the CLI deployment tool:

% JAVA com.bea.wlevs.deployment.Deployer—url http://server1:9002/wlevsdeployer-install myapp_1.0—group default The application myapp_1.0 can be deployed to both servers as they are members of the same group, the Domain group.

Note that if instead we had deployed without specifying a group, then the application would be deployed to the server1's internal group and not to server2.

The event servers can be as homogeneous and de-coupled. Although it can be possible to target different applications at different servers, one predominant use case is of identical servers running identical applications. In one embodiment, this has a number of implications.

1. No centralized configuration store
2. No centralized management.
3. Simple management of groups of homogeneous servers.

Creating server instances can be entirely trivial. Servers can be self-configured. Users starting new instances need not have to worry about assigning network addresses, cluster configuration etc. In one embodiment, servers can discover one another.

Application(s) can continue to run if the event server becomes unresponsive due to any type of "prolonged" interruption of service. Such failures can be detected, causing the server to shutdown. The Application state of the failed server will be lost. Overall service availability can be maintained by having duplicate servers and applications.

It can be possible to distribute an application and its configuration to multiple servers. There need be no "master configuration" server—all servers should be homogeneous within a pre-defined group. Distribution can deal with new or restarted servers joining the cluster. Different applications can be run on different server groups.

Event server instances acting in a group can use a mechanism to both determine membership and distribute control information to group members. This can be achieved using the Group Control Protocol (GCP). The GCP can provide fault-tolerant membership and group broadcast facilities. It can be based on multicast, and therefore not be suitable for broadcasting large amounts of data. Instead a higher level service—group broadcast—can leverage GCP to achieve isolation and make spanning tree decisions, but use point-to-point communication for actual data transmission.

GCP can be based on the TOTEM abcast scheme, as well as control messages for GBcast, periodic heartbeats will be sent round the cluster using GCP to keep membership information—and hence fault detection—current and accurate.

The Group Broadcast Protocol (GBcast) can provide atomic group broadcast facilities for messages of arbitrary sizes to groups of arbitrary membership. GBcast can leverage GCP to provide update isolation but will use point-to-point communication for actual message transmission. Consumers of this service can be able to arbitrarily partition the servers within a cluster and broadcast messages to these configuration groups. Broadcast can be transactional and atomic through the use of GCP as a control layer/lock manager. Group partitions can be overlapping.

GBcast can use a replication protocol that minimizes deadlocks and control messages.

A framework can be provided that allows adapters to register for failover events. The framework can allow the identification of the "active" adapter in a cluster and thus allow adapter functionality to take appropriate action when failover occurs. Since there is no shared state it need not be possible to synchronized adapters in any way and it is assumed that developers can therefore retain a large enough window of events to cope with outage during failover. For example a system delivering alerts based on retained data can redeliver alerts falling within the failover interval when failover occurs.

Distributed deployment can handle the task of distributing a single application to multiple servers in a server group. It can use both GCP and some form of network communication protocol to distribute application artifacts in a transaction manner.

The following cluster-wide attributes can be provided:
Cluster Members (An ordered list of server names and ids)
Cluster Multicast Address
The following cluster-specific server attributes will also be provided.
Server identity
Group membership Application attributes can be shared across a cluster. Applications that need to configure attributes on a per-server basis can use system property macro expansion in their Spring configuration files.

Existing persistent artifacts can be used as appropriate. There need not be any shared domain-wide configuration file. Each server can keep a local copy of any domain-specific configuration.

In order to prevent malicious subversion of the configuration system by an attacker, it can be possible to configure servers with a shared cluster-wide secret. This secret can then be used to sign cluster messages to prevent tampering. In one embodiment, no attempt is made to protect the confidentiality of messages.

Messages can be versioned to allow for the provision of rolling upgrade at a future date.

Messages can encode domain identity to prevent unintentional overlap of different domains on the same multicast address.

Embodiments of the present invention can include computer-based methods and systems which may be implemented using conventional general purpose or a specialized digital computer(s) or microprocessor(s), programmed according to the teachings of the present disclosure. Appropriate software coding can readily be prepared by programmers based on the teachings of the present disclosure.

Figure 2:
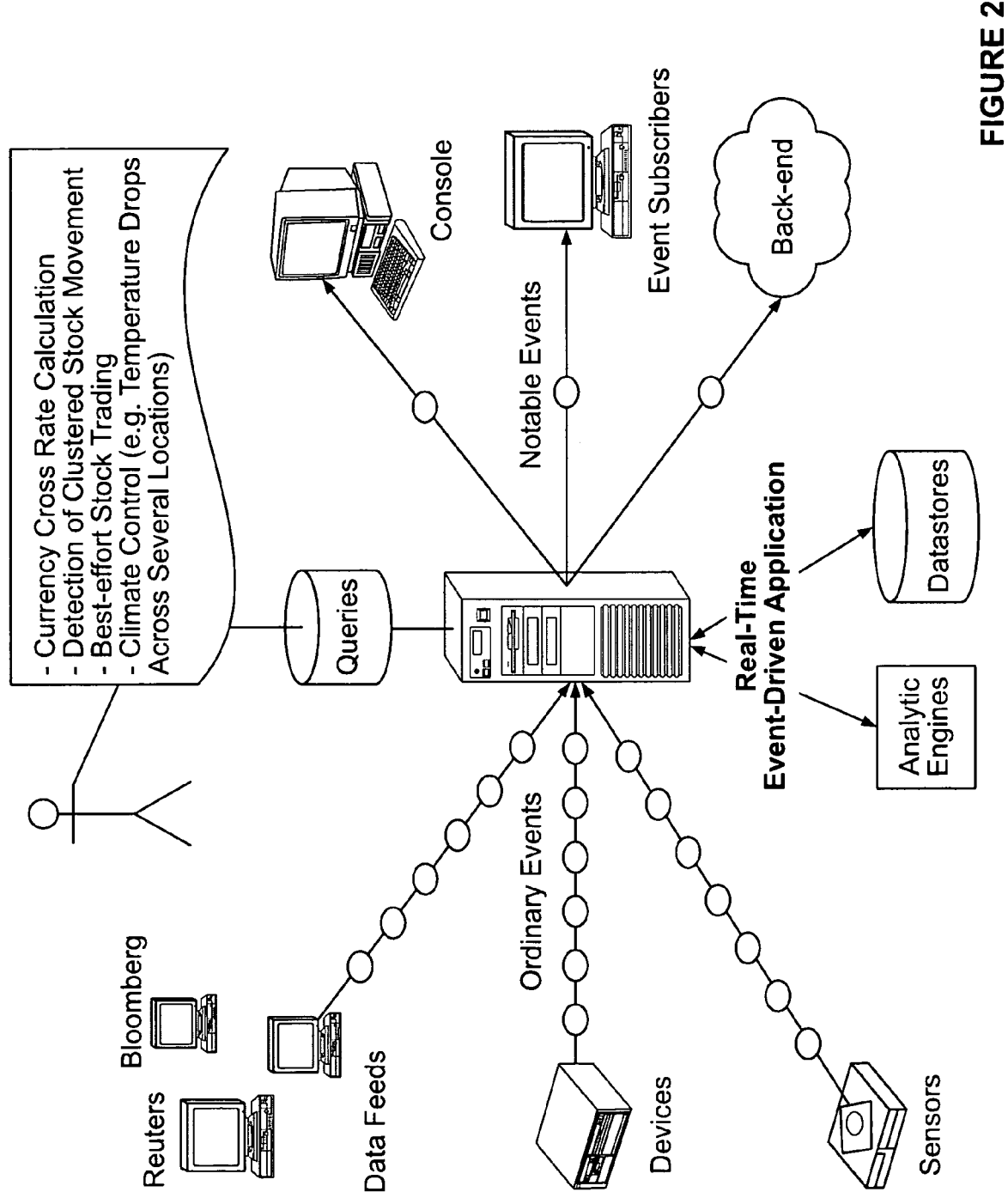
FIG. 2 shows an event server of one embodiment.

An exemplary event server is shown in FIG. 2. An Event Server can be a low latency framework, such as JAVA based middleware framework for event driven applications. The event server can be a lightweight application server which can connect to high volume data feeds and can have a complex event processing engine (CEP) to match events based on user defined rules.

The Event Server can have the capability of deploying user JAVA code (POJOs) which contain the business logic. Running the business logic within the Event Server can provide a highly tuned framework for time and event driven applications.

An event-driven system can be comprised of several event sources, the real-time event-driven (WebLogic Event Server) applications, and event sinks. The event sources can generate streams of ordinary event data. The Event Server applications can listen to the event streams, process these events, and generate notable events. Event sinks can receive the notable events.

Event sources, event-driven applications, and event sinks can be de-coupled from each other; one can add or remove any of these components without causing changes to the other components.

Event-driven applications can be rule-driven. These rules, or queries, which can be persisted using some data store, are used for processing the inbound stream of events, and generating the outbound stream of events. Generally, the number of outbound events can be much lower than that of the inbound events.

The Event Server can be a middleware for the development of event-driven applications. The Event Server application can be essentially an event-driven application.

Figure 3:
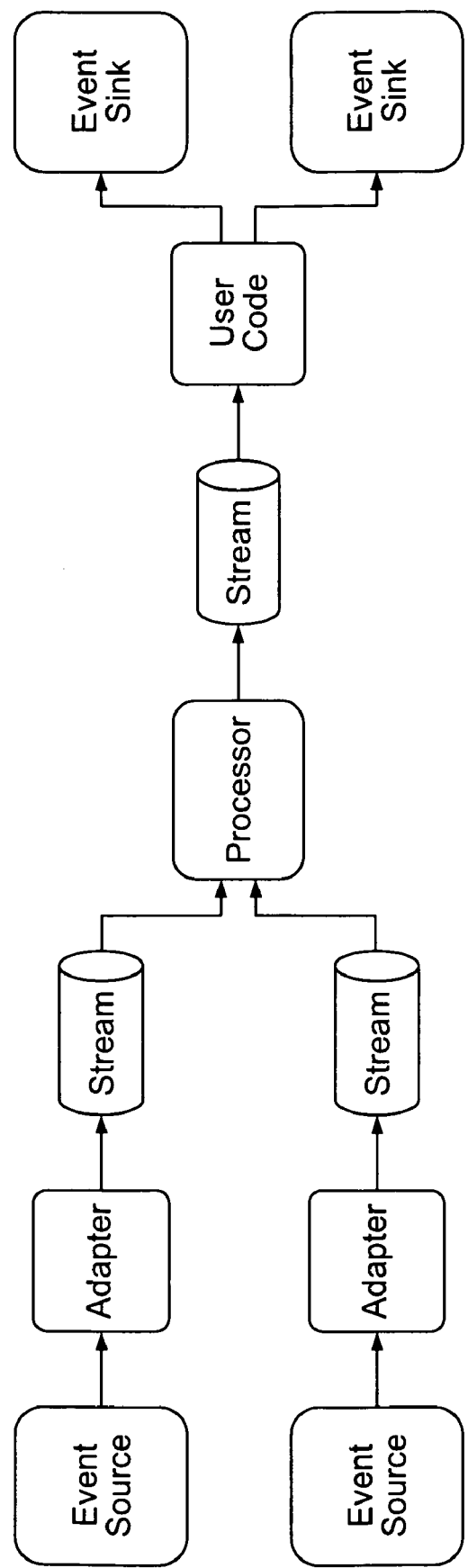
FIG. 3 shows a realtime application that can run on an event server.

An application can be hosted by the Event Server infrastructure, a light-weight container. The application can be as described by the diagram of FIG. 3.

An Event Server application can be comprised of four main component types. Adapters can interface directly to the inbound event sources. Adapters can understand the inbound protocol, and be responsible for converting the event data into a normalized data that can be queried by a processor (i.e. event processing agent, or processor). Adapters can forward the normalized event data into Streams. Streams can be event processing endpoints. Among other things, streams can be responsible for queuing event data until the event processing agent can act upon it. The event processing agent can remove the event data from the stream, process it, and may generate new events to an output stream. The user code can register to listen to the output stream, and be triggered by the insertion of a new event in the output stream. The user code can be generally just a plain-old-JAVA-object (POJO). The user application can make use of a set of external services, such as JMS, WS, and file writers, to forward on the generated events to external event sinks.

Adapters, streams, processors, and business logic POJOs can be connected arbitrarily to each other, forming event processing networks (EPN). Examples of topologies of EPN's are:

Adapter>Stream>Business Logic POJO
Scenario: no processing is needed, aside adaptation from proprietary protocol to some normalized model.
Adapter>Stream>Processor>Stream>Business Logic POJO
Scenario: straight through processing to user code.
Adapter>Stream>Processor>Stream>Business Logic POJO>Stream>Processor>Stream->Business Logic POJO
Scenario: two layers of event processing, the first processor creates causality between events, and the second processor aggregates events into complex events.

Event Processing Networks can have two important attributes.

First, event processing networks can be used to create hierarchy of processing agents, and thus achieve very complex processing of events. Each layer of the Event Processing Network can aggregate events of its layer into complex events that become simple events in the layer above it.

A second attribute of event processing networks is that it helps with integrability, that is, the quality of having separately developed components work correctly together. For example, one can add user code and reference to external services at several places in the network.

The use cases for the Event Server can span a variety of businesses:

Financial: Algorithmic Trading:
Automate stock trading based on market movement. Sample query: if, within any 20 second window, StockB rises by more than 2% and StockA does not, then automatically buy StockA.
Transportation: Security and Fraud Detection:
Discover fraudulent activity by detecting patterns among events. Sample query: if a single ID card is used twice in less than 5 seconds to gain access to a city's subway system, alert security for piggybacking.
Energy and Telecommunications: Alarm Correlation:
Reduce false positive alarms. Sample query: When 15 alarms are received within any 5 second window, but less than 5 similar alarms detected within 30 seconds, then do nothing.
Health Care: Patient Monitoring:
Monitor the vital signs of a patient and perform some task if a particular event happens. Sample query: When a change in medication is followed by a rise in blood pressure within 20% of maximum allowable for this patient within any 10 second window, alert nearest nurse.

An application server can support deployment of Plain Old JAVA applications (POJOs), or Spring applications, for handling large volumes of streaming data with low latency requirements.

Event Server applications can be developed and deployed as event driven applications, that is, a set of custom Spring tags is used to define the event processing network in the EPN assembly file, which extends the standard Spring context file, of your application.

The application server can contain a set of real time services that include a complex event processor (CEP), adapters, and streams. The server can be tuned for high message throughput and low latency and deterministic behavior.

The complex event processor can be a high performance, continuous query engine for processing high volumes of streaming data. It can have full support for filtering, correlation, and aggregation of streaming data from one or more streams.

An event processing language can be used. The Event Processing Language (EPL), can be a SQL-like language that allows event data from streams to be declaratively filtered, correlated, aggregated, and merged, with the ability to insert results into other streams for further downstream processing. The EPL rules can be defined in an XML file that configures the complex event processor or programmatically using APIs.

An Adapter SDK can provide all the tools you need to create adapters that listen to incoming data feeds.

A load generator utility can simulate a data feed, useful for testing your application without needing to connect to a live data feed.

A monitoring service can include pre-built instrumentation for measuring throughput and latency at the component level.

A static and dynamic configuration framework can be used. Static configuration can be performed using XML files; dynamic configuration can be performed by accessing configuration and runtime MBeans using JMX and with the command-line utility wlevs.Admin.

The Event Server can be built on a microServices Architecture (mSA) which can use an OSGi-based framework to manage services provided by modules or feature sets. A mSA can provide the following services:

Jetty, an HTTP container for running servlets.
javax.sql.DataSource implementation and thin JDBC drivers for accessing a relational database.
Logging and debugging.
Authentication and authorization security.

Embodiments of the present invention can include a computer readable medium, such as computer readable storage medium. The computer readable storage medium can have stored instructions which can be used to program a computer to perform any of the features present herein. The storage medium can include, but is not limited to, any type of disk including floppy disks, optical discs, DVD, CD-ROMs, micro drive, and magneto-optical disks, ROMs, RAMs, EPROMs, EEPROMs, DRAMs, flash memory or any media or device suitable for storing instructions and/or data. The present invention can include software for controlling both the hardware of a computer, such as general purpose/specialized computer(s) or microprocessor(s), and for enabling them to interact with a human user or other mechanism utilizing the results of the present invention. Such software may include, but is not limited to, device drivers, operating systems, execution environments/containers, and user applications.

Embodiments of the present invention can include providing code for implementing processes of the present invention. The providing can include providing code to a user in any manner. For example, the providing can include transmitting digital signals containing the code to a user; providing the code on a physical media to a user; or any other method of making the code available.

Embodiments of the present invention can include a computer-implemented method for transmitting the code which can be executed at a computer to perform any of the processes of embodiments of the present invention. The transmitting can include transfer through any portion of a network, such as the Internet; through wires, the atmosphere or space; or any other type of transmission. The transmitting can include initiating a transmission of code; or causing the code to pass into any region or country from another region or country. A transmission to a user can include any transmission received by the user in any region or country, regardless of the location from which the transmission is sent.

Embodiments of the present invention can include a signal containing code which can be executed at a computer to perform any of the processes of embodiments of the present invention. The signal can be transmitted through a network, such as the Internet; through wires, the atmosphere or space; or any other type of transmission. The entire signal need not be in transit at the same time. The signal can extend in time over the period of its transfer. The signal is not to be considered as a snapshot of what is currently in transit.

The forgoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. For example, steps preformed in the embodiments of the invention disclosed can be performed in alternate orders, certain steps can be omitted, and additional steps can be added. The embodiments were chosen and described in order to best explain the principles of the invention and its practical application, thereby enabling others skilled in the art to understand the invention for various embodiments and with various modifications that are suited to the particular used contemplated. It is intended that the scope of the invention be defined by the claims and their equivalents.

The invention claimed is:

1. A system, including one or more event servers for receiving input streams of events and producing output streams of events, comprising:
a cluster, which includes a plurality of event servers operating therein, and which further includes
one or more domains defined therein, each of which uses a different multicast address and which logically connects event servers for purposes of management, and
within each of the one or more domains, a plurality of groups defined therein, including a domain group that includes all of the active members of that domain;
wherein each of the event servers are configured to be part of at least one group in the cluster and includes a unique name within that group, and wherein each of the event servers are adapted to be clustered with other event servers as part of the system, and used to process events, including that each event server uses configuration data to control the event processing, wherein each event server multicasts updates of the configuration data to the other event servers of the cluster in its group, and wherein each event server receives multicasted configuration updates from the other event servers of the cluster in its group;
wherein an event server application can be deployed to the system by specifying a named group to which the application is to be deployed; and
wherein the system automatically deploys the application to other event servers that are part of the named group, by multicasting the deployment configuration data from a first member of the named group to other members of the named group.

2. The system of claim 1, wherein the event servers of the cluster do not share a common memory.

3. The system of claim 1, wherein the multicasting messages go to all of the other event servers of the cluster having the same multicast address.

4. The system of claim 1, wherein upon a failure of one of the event server of the cluster, another event server of the cluster continues processing.

5. The system of claim 1, wherein a particular server's cluster configuration can be modified to use the same multicast address as an other domain or group therein, to add that particular server to that other domain or group, and wherein the system recognizes the change in the particular server's configuration data, and automatically deploys applications to that particular server matching its new cluster configuration.

6. A computer implemented method for use with a cluster of event servers comprising:
providing a cluster which includes a plurality of event servers operating therein, and which further includes
one or more domains defined therein, each of which uses a different multicast address and which logically connects event servers for purposes of management, and
within each of the one or more domains, a plurality of groups defined therein, including a domain group that includes all of the active members of that domain,
wherein each of the event servers are configured to be part of at least one group in the cluster and includes a unique name within that group, and wherein each of the event servers are adapted to be clustered with other event servers as part of the system, and used to process events, including that each event server uses configuration data to control the event processing, wherein each event server multicasts updates of the configuration data to the other event servers of the cluster in its group, and wherein each event server receives multicasted configuration updates from the other event servers of the cluster in its group;
receiving an input event stream;
processing the event stream using the configuration data;
producing an output event stream;
multicasting updates of the configuration data to other event servers of the cluster; and
receiving multicasted updates from at least one of the other event servers of the cluster, including wherein an event server application can be deployed to the system by specifying a named group to which the application is to be deployed, and wherein the system automatically deploys the application to other event servers that are part of the named group, by multicasting the deployment configuration data from a first member of the named group to other members of the named group.

7. The computer implemented method of claim 6, wherein the event servers of the cluster do not share a common memory.

8. The computer implemented method of claim 6, wherein the multicasting messages go to all of the other event servers of the cluster having the same multicast address.

9. The computer implemented method of claim 6, wherein upon a failure of one of the event servers of the cluster, another event server of the cluster continues processing.

10. The computer implemented method of claim 6, wherein a particular server's cluster configuration can be modified to use the same multicast address as an other domain or group therein, to add that particular server to that other domain or group, and wherein the system recognizes the change in the particular server's configuration data, and automatically deploys applications to that particular server matching its new cluster configuration.

11. A computer readable storage medium containing instructions stored therein which when read and executed by a computer cause the computer to perform the steps comprising:

provide a cluster which includes a plurality of event servers operating therein, and which further includes
one or more domains defined therein, each of which uses a different multicast address and which logically connects event servers for purposes of management, and
within each of the one or more domains, a plurality of groups defined therein, including a domain group that includes all of the active members of that domain,
wherein each of the event servers are configured to be part of at least one group in the cluster and includes a unique name within that group, and wherein each of the event servers are adapted to be clustered with other event servers as part of the system. and used to process events, including that each event server uses configuration data to control the event processing, wherein each event server multicasts updates of the configuration data to the other event servers of the duster in its group, and wherein each event server receives multicasted configuration updates from the other event servers of the cluster in its group;
receive an input event stream;
process the event stream using the configuration data;
produce an output event stream;
multicasting updates of the configuration data to other event servers of the cluster; and
receive multicasted updates from at least one of the other event server of the cluster including wherein an event server application can be deployed to the system by specifying a named group to which the application is to be deployed, and wherein the system automatically deploys the application to other event servers that are part of the named group. by multicasting the deployment configuration data from a first member of the named group to other members of the named group.

12. The computer readable storage medium of claim 11, wherein the event servers of the cluster do not share a common memory.

13. The computer readable storage medium of claim 11, wherein the multicast messages go to all of the other event servers of the cluster having the same multicast address.

14. The computer readable storage medium of claim 11, wherein upon a failure of one of the event servers of the cluster, another event processor of the cluster continues processing.

15. The computer readable storage medium of claim 11, wherein a particular server's cluster configuration can be modified to use the same multicast address as an other domain or group therein, to add that particular server to that other domain or group, and wherein the system recognizes the change in the particular server's configuration data, and automatically deploys applications to that particular server matching its new cluster configuration.

* * * * *

UNITED STATES PATENT AND TRADEMARK OFFICE
CERTIFICATE OF CORRECTION

| | |
|---|---|
| PATENT NO. | : 7,818,370 B2 |
| APPLICATION NO. | : 12/332490 |
| DATED | : October 19, 2010 |
| INVENTOR(S) | : Andrew Piper et al. |

It is certified that error appears in the above-identified patent and that said Letters Patent is hereby corrected as shown below:

In column 3, line 11, delete "groupconfiguration);" and insert -- groupConfiguration); --, therefor.

In column 12, line 50, in claim 6, delete "multicastinq" and insert -- multicasting --, therefor.

In column 13, line 19, in claim 11, delete "system." and insert -- system, --, therefor.

In column 13, line 22, in claim 11, delete "duster" and insert -- cluster --, therefor.

In column 14, line 7, in claim 11, delete "group." and insert -- group, --, therefor.

Signed and Sealed this
Thirty-first Day of May, 2011

David J. Kappos
*Director of the United States Patent and Trademark Office*